Patented Oct. 8, 1946

2,408,830

UNITED STATES PATENT OFFICE 2,408,830

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944, Serial No. 535,754

11 Claims. (Cl. 260—397.4)

This invention relates to the preparation of new compounds of the pregnane series which are oxygenated in the nuclear position 12. These compounds are useful intermediates in the preparation of hormone products.

In the copending Patent No. 2,352,852, issued July 4, 1944, a method was described by which steroidal sapogenins may be isomerized to pseudo-sapogenins and these pseudo-sapogenins further mildly oxidized and hydrolyzed to give 16–17 un-saturated 20 keto pregnane series compounds. The transformations may be indicated as follows:

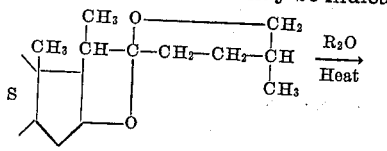

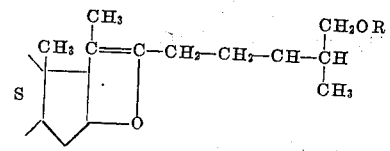

Oxidation | and hydrolysis

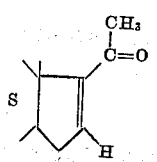

where S represents the rings A, B and C of the steroid nucleus and R is an acyl radical (R₂O representing an acyl anhydride).

I have now found that these reactions may also be applied to newly discovered steroidal sapogenins which are oxygenated in ring C at position 12 and decribed in my copending application, Serial No. 535,759, filed May 15, 1944, and carrying as well further hydroxyl substituents at positions 2 and 3, e. g. manogenin (2-hydroxy-12-keto-tigogenin), agavogenin (2,12-dihydroxy tigogenin), and mexogenin (2-hydroxy-12-keto smilagenin). The corresponding pseudo-sapogenins are described in my copending application, Serial No. 535,755, filed May 15, 1944.

The invention may be illustrated by the following example:

*16-allo-pregnen-2,3(β)-diol-12,20-dione.*—To a solution of 2 g. of pseudomanogenin triacetate in 30 cc. of acetic acid was added a solution of 1.2 g. chromic anhydride in 10 cc. of 80% acetic acid. After the reaction mixture had stood at 20° for ninety minutes it was diluted with water and the product was extracted with ether. The ethereal solution was washed free from acetic acid and evaporated. The residue was hydrolyzed with 2% alcoholic potassium hydroxide for thirty minutes. The hydrolysis mixture was diluted with an equal volume of water and extracted with a large volume of ether (3-liters). The ether was removed and the residue was acetylated and crystallized from aqueous methanol as white plates, M. P. 264–267°. This is 16-allo-pregnen-2,3(β)-diol-12,20-dione.

In the same manner pseudo-mexogenin yields 16-pregnene-2,3-diol-12,20-dione and pseudo-agavogenin yields 16-allo-pregnene-2,3,12-triol-20-one. If it is desired to use an ester in further processing of these hormone intermediates such derivatives may be prepared in the usual manner, e. g. by boiling with acid anhydride or by treatment with acid anhydride and pyridine at temperatures between 20° and 100° C. In any case all hydroxyls acylate with about equal ease, there being essentially no qualitative difference in reactivity.

The transformations described may be illustrated as follows:

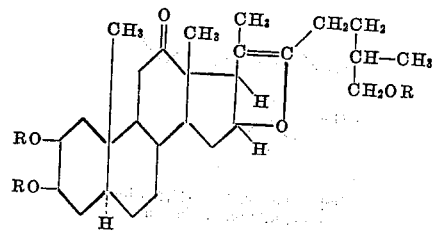

Pseudo-manogenin triacylate (e. g. triacetate)

Oxidation | and Hydrolysis

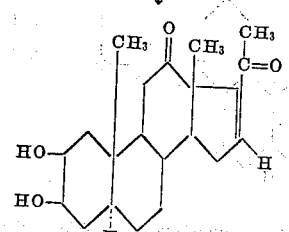

16-allo-pregnene-2,3-diol-12,20-dione

R₂O | [e. g. (CH₃CO)₂O]

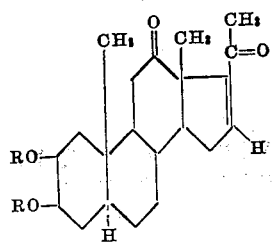

16-allo-pregnene-2,3-diol-12,20-dione diacylate (e. g. diacetate)

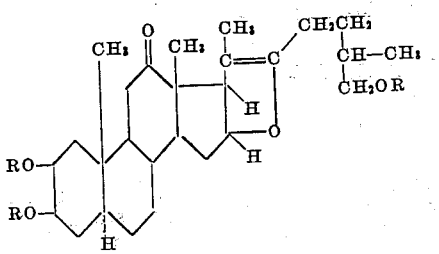

Pseudo-mexogenin triacylate (e. g. triacetate)

Oxidation ↓ and hydrolysis

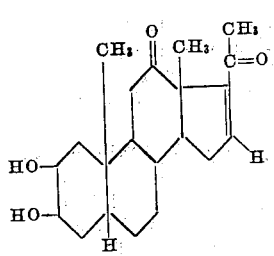

16-pregnene-2,3-diol-12,20-dione $R_2O$ ↓ [e. g. $(CH_3CO)_2O$]

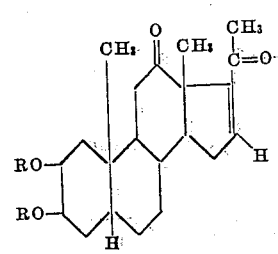

16-pregnene-2,3-diol-12,20-dione diacylate (e. g. diacetate)

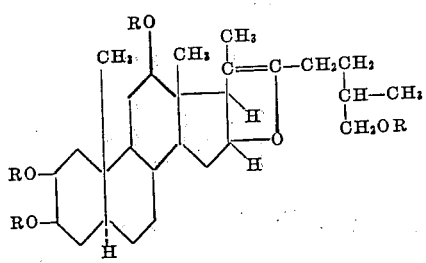

Pseudo-agavogenin tetra-acylate (e. g. tetra-acetate)

Oxidation ↓ and hydrolysis

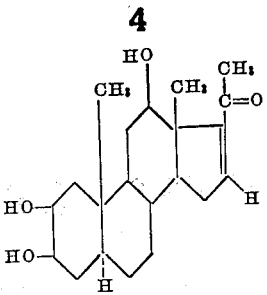

16-allo-pregnene-2,3,12-triol-one-20

$R_2O$ ↓ [e. g. $(CH_3CO)_2O$]

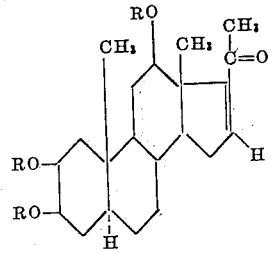

16-allo-pregnene-2,3,12-triol-20-one acylate (e. g. acetate)

What I claim is:
1. A compound of the formula

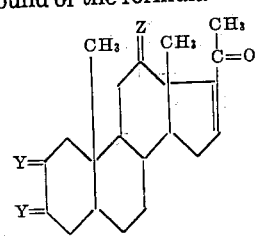

where Y is a member of the class

and groups hydrolyzable to

and Z is a member of the class

groups hydrolyzable to

and =O.

2. A compound of the formula

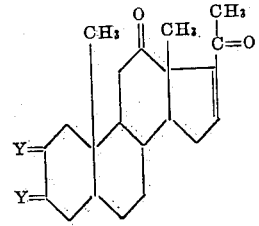

where Y is a member of the class

and groups hydrolyzable to
3. 16-allo-pregnene-2,3-diol-12,20-dione acylates.
4. 16-pregnene-2,3-diol-12,20-dione acylates.
5. 16-allo-pregnene-2,3-diol-12,20-dione diacetate.
6. 16-pregnene-2,3-diol-12,20-dione diacetate.
7. 16-allo-pregnene-2,3,12-triol-20-one acylates.
8. 16-allo-pregnene-2,3,12-triol-20-one triacetate.
9. 16-pregnene-2,3-diol-12,20-dione.
10. 16-allo-pregnene-2,3-diol-12,20-dione.
11. 16-allo-pregnene-2,3,12-triol-20-one.
ROMEO B. WAGNER.